H. C. DAVIS.
TIRE CHAIN.
APPLICATION FILED APR. 21, 1916.
1,219,088.
Patented Mar. 13, 1917.
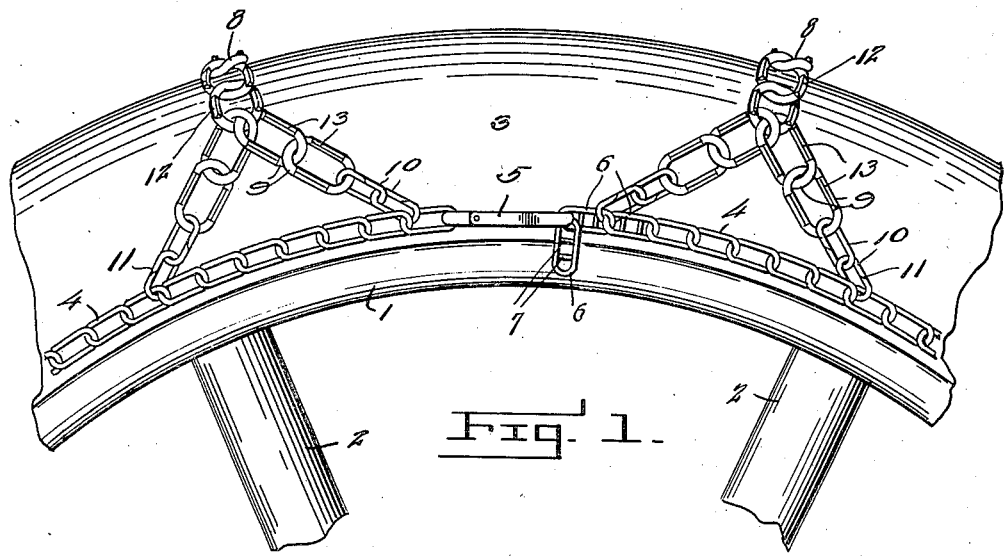
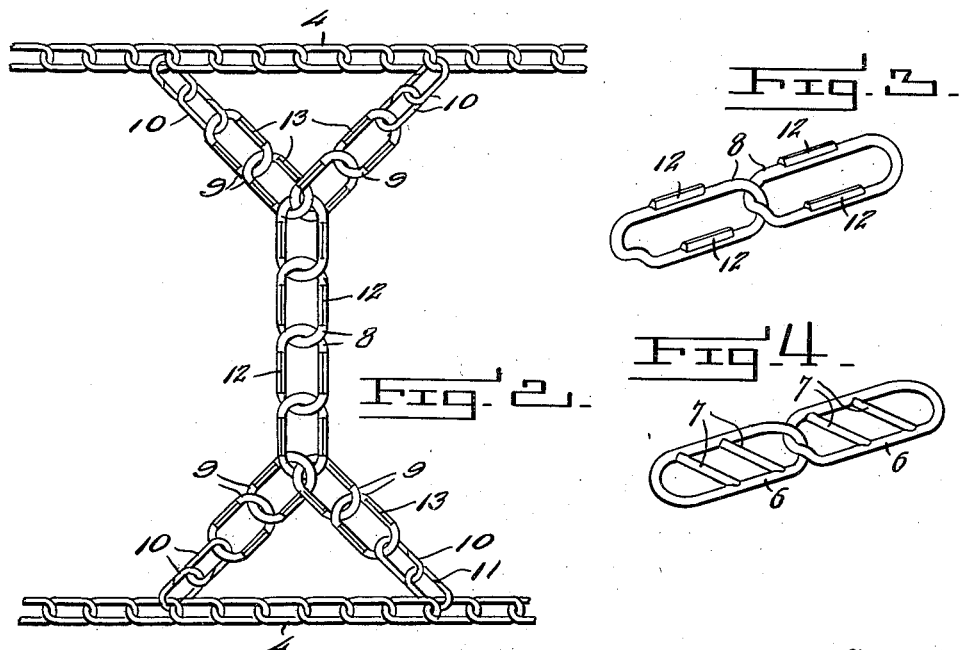
Inventor
H. C. Davis.

UNITED STATES PATENT OFFICE.

HOWARD C. DAVIS, OF CAMBRIDGE, OHIO.

TIRE-CHAIN.

1,219,088.  Specification of Letters Patent.  Patented Mar. 13, 1917.

Application filed April 21, 1916. Serial No. 92,686.

*To all whom it may concern:*

Be it known that I, HOWARD C. DAVIS, a citizen of the United States, residing at Cambridge, in the county of Guernsey and State of Ohio, have invented certain new and useful Improvements in Tire-Chains, of which the following is a specification.

This invention relates to certain new and useful improvements in tire chains and it has for its objects among others to provide a simple and efficient tire chain which when in use will assume an effective purchase on the ground or surface to eliminate skidding of the machine under all conditions and which will prove most advantageous in securing proper traction of the drive wheels during travel of the machine over muddy or sandy roads.

It has for a further object to provide a tire chain having its links so constructed where used for the cross chains, that the chain can be used only on one side. The cross chain links are made smaller where they connect on the side chain so as to eliminate some of the weight.

The connecting link of the cross chain can be readily disconnected from the side chain by simply opening the link, these links being of any well known form of split link, or links so constructed that they can be readily opened.

The invention further contemplates the provision of a device of this character which can be quickly and easily attached to or removed from the tire when desired, and when applied capable of being finally adjusted whereby the chain can be properly and snugly held upon the tire.

The links of the cross chains, as well as a portion of the links that connect said cross chains with the side chains, are provided with elongated projections adapted to engage the ground and not only provide better traction but prevent sidewise movement of the wheel.

Other objects and advantages of the invention will hereafter appear and the novel features thereof will be particularly pointed out in the appended claims.

The invention is clearly illustrated in the accompanying drawings, which, with the numerals of reference marked thereon, form a part of this specification, and in which—

Figure 1 is a fragmentary side elevation of a wheel showing the chain arranged thereon for use.

Fig. 2 is a plan view of a portion of the chain.

Fig. 3 is an enlarged detail view of several of the links of the chain.

Fig. 4 is a similar view of the connecting links.

Like numerals of reference indicate like parts throughout the several views.

Referring more particularly to the drawings by reference numerals, 1 designates the rim of a wheel of any well-known or suitable form of construction, 2 designating the spokes thereof and 3 a pneumatic tire and with the latter is adapted to be associated the tire chain forming the subject matter of the present invention.

This improved tire chain comprises the side chains 4 which may be of any suitable well-known or preferred form of construction, being shown as formed of links adapted to extend around the tire adjacent the rim, in the usual manner. It is to be understood that there is a chain 4 upon each side of the tire, as will be readily understood upon reference to Fig. 2, and the ends of each chain are adapted to be united as is common in this class of devices. One end of the chain is provided with a suitable device 5 which may be in the nature of a snap hook or the like and the opposite end of the chain is provided with one or more links 6, as seen in Fig. 1, and these links are shown in enlarged perspective in Fig. 4. Each of these links 6 is divided by one or more cross bars 7 into a plurality of sections, whereby the snap hook may readily engage either end of the said links or an intermediate cross bar 7 thereof, whereby a fine adjustment for the chain 4 to permit the latter to be snugly fitted to and secured upon wheels of different diameters is provided for.

In Fig. 1 I have shown an extra link 6, providing for lengthening of the chain to the extent of the length of this link in case it is desired to apply it to a wheel of greater diameter than that herein shown.

8 are cross chains of which there may be any desired number according to the spacing of the same and these cross chains are adapted to embrace the outer periphery of the tire 3 at different points, as indicated, the said cross chains extending to points upon opposite sides of the tire to which each end of the cross chain is joined by links 9, 9 of a similar nature to smaller links 10, 10 which, in turn, are connected to the side chains 4. The links 10 at one end of the links 9 are of the split or open variety, as seen at 11, or any other form, so that the links may be readily opened for disconnection with the side chains or for connection therewith, in a manner which will be readily understood. The branches formed by the links 9 and 10 are disposed divergently, as seen in Figs. 1 and 2, and the cross chains and their attaching links 9 are so constructed that they can be used only in one position, that is with only one side adjacent the tire, because their opposite sides are provided with the elongated tapered projections 12, as seen best in Fig. 3. These projections may extend for a greater or less portion of the length of the links. The links 9 are provided with similar projections 13, as seen in Fig. 2.

It is to be noted that the smaller links 10 are not provided with these tapered projections because such links cannot under any circumstances come in contact with the ground, and, hence, such spurs or projections are not necessary. However, all of the links of the cross chains and the divergent chains which can by any means possibly come in contact with the ground are provided with these projections. These projections may vary in size, but preferably the links on the side connecting chains will have larger projections than those on the cross chains so as to afford a better purchase where they come in contact with the ground.

The chain in its entirety is so constructed that all the links thereof lie practically flat or substantially so upon the tire, with a view of reducing the wear and tear on the tire, by reason of their contact therewith, to a minimum.

By the construction above described, it will be readily understood that there is a coöperation between the cross chains and the links 9 which will serve to prevent skidding of the machine and at the same time assure proper traction of the driving wheels when the machine is traveling over soft earth, sandy roads or slippery pavements.

Modifications in details may be resorted to without departing from the spirit of the invention or sacrificing any of its advantages.

What is claimed is:—

1. A device of the class described comprising a pair of spaced longitudinally extending chains, a plurality of transverse chains each terminating at its opposite ends to provide divergently disposed branches, the latter being connected with said longitudinal chains, longitudinal projections on all of said transverse chains and their branches, and means for connecting the ends of said longitudinal chains.

2. A tire chain comprising side chains and a plurality of cross chains at right angles to said side chains and of less length than the distance between the latter with divergently disposed links connecting the ends of the cross chains with the side chains, the cross chains and adjacent divergent links having longitudinally disposed projections for contact with the ground.

In testimony whereof I affix my signature in the presence of two witnesses.

HOWARD C. DAVIS.

Witnesses:
A. L. STEVENS,
R. W. LINDSEY.